United States Patent Office 2,963,466
Patented Dec. 6, 1960

2,963,466

DICHLOROUREA-DIAMINE RESINS

Cornelius Sherman Grove, Jr., East Syracuse, and Vivian T. Stannett, Syracuse, N.Y., assignors to W. R. Grace & Co., New York, N.Y., a corporation of Connecticut No Drawing. Filed Feb. 20, 1958, Ser. No. 716,279

4 Claims. (Cl. 260—77.5)

This invention relates to a new urea diamine polymer and to a method of producing it.

One of the objects of the present invention is to provide a new polyamide of the unit structure

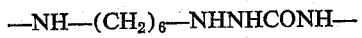

Another object of this invention is to provide a method of producing the aforesaid polymer.

Other objects will be apparent from the following description.

Polyamides of the type

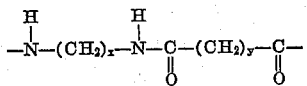

are old in the art; see W. H. Carothers, Collected Papers (1940) wherein is disclosed the preparation of polyamides by reacting together a dicarboxylic acid (e.g., adipic) and a diamine (e.g., hexamethylenediamine). Such polyamides can also be formed by self condensation of an amino acid (as disclosed, e.g., in U.S. Patent No. 2,071,253), or by a combination of the above mentioned types. The polyamide of this invention differs from those of the prior art by reason of the presence of the hydrazinyl grouping in the recurring unit.

In summary, the present invention involves subjecting dichlorourea to the action of hexamethylenediamine, whereby the new polyamide polymer is formed. The reaction is highly exothermic and when not carefully controlled an extremely vigorous reaction generating abundant heat and vapor results. For this reason the reaction is suitably conducted in a vessel contained in an ice bath. Other suitable means for absorbing the heat evolved by the reaction may be used. If desired, an inert solvent, e.g., heptane or the like, may also be used to assist in absorbing the heat of reaction. A suitable mole ratio for the reactants is substantially 1:1. An excess of either reactant, e.g., 1-10:1-10 respectively, may be added if desired, but the increase in yield is not substantial. Time and temperature of the reaction affect polymer color. In general the longer the reactants are held in the temperature range of −10° to +10° C. the lighter the color of the polymer.

The following examples will aid in explaining the process utilized in making the product.

EXAMPLE 1

*Preparation of a urea diamine product*

2.79 grams of a 72% aqueous hexamethylenediamine solution were charged into a glass vessel immersed in a cold temperature bath held at −10° to 0° C. To the glass vessel was slowly added 2.44 grams of solid dichlorourea (ClNHCONHCl). After the addition of all the dichlorourea, the glass vessel was removed from the bath and allowed to warm to room temperature. Within a few minutes an extremely vigorous reaction took place evolving substantial heat and vapor. A clear dark amber resinous solution resulted. On cooling a dark brown opaque semi-solid formed, characteristic of a low molecular weight resin.

EXAMPLE 2

*Preparation of a urea diamine product*

2.12 grams of a 72% aqueous hexamethylenediamine solution were placed in a glass vessel immersed in a cold temperature bath maintained at 0° C. 1.77 grams of solid dichlorourea were slowly added to the glass vessel. After the addition of all the dichlorourea, the reactants were maintained in the bath (0° C.) for approximately one additional hour. Following this extended cooling period, the reactants were removed and allowed to reach room temperature. No reaction was observed; in fact, two phases (a solid and a liquid) were still present. To force the reaction to completion, heat was added using an oil bath maintained at 100° C. The reaction was mild and a clear medium amber resinous solution formed. Upon cooling a medium brown opaque semi-solid resulted.

Qualitative solubility tests showed the resin to be insoluble in the following solvents: dioxane, chloroform, dilute NaOH solution, and dilute HCl solution. It was partially soluble in water.

EXAMPLE 3

*Molding a saucer*

A weighed quantity (about 10 g.) of a 72% aqueous hexamethylenediamine solution was placed in a glass vessel immersed in a cold temperature bath maintained at 0° C. To this was slowly added solid dichlorourea in a mole ratio of substantially 1:1. After the addition of the dichlorourea the reactants were maintained in the bath (0° C.) for approximately one hour at which time sufficient wood flour to make up to 70:30 reactants to wood flour weight ratio was added. The glass vessel was removed from the bath and allowed to reach room temperature. The contents of the glass vessel were then transferred to a jacketed mold. The mold was closed and heated to approximately 100° C. whereat the reaction took place. Thereafter a pressure of 3000 pounds per square inch was applied for 10 minutes (cure period). The cure period is dependent upon various factors; namely speed of cure of the molding compound, thickness of the molded object, overall size of the object and temperature. After curing, the mold was cooled and opened, whereby knock-out pins ejected a saucer.

As shown in Example 3, the resin can be used in the molding industry and in addition as surface coating for various ornamental or functional articles. Other uses for which the resin is applicable include bottle closures, tableware, panel boards, wood bonding, and the like. It can also be drawn into fibers.

We claim:

1. A process for producing a resinous polyamide comprising condensing hexamethylenediamine with an equimolar amount of dichlorourea at a temperature in the range of −10° to 100° C., and recovering the resulting product.

2. A process for producing a resinous polyamide by condensing hexamethylenediamine with an equimolar amount of dichlorourea in an aqueous solution maintained at an initial temperature in the range of −10° to +100° C. and thereafter heating the aforementioned solution to a temperature above the said initial temperature and separating the resulting resinous polyamide product therefrom.

3. The process according to claim 2 in which the reactants are maintained at the initial temperature up to an hour.

4. The process according to claim 2 in which the heating step is carried out at a temperature in the range of 10° to 100° C.

References Cited in the file of this patent

FOREIGN PATENTS

| | | |
|---|---|---|
| 54,534 | Netherlands | May 15, 1943 |
| 530,267 | Great Britain | Dec. 9, 1940 |
| 893,897 | France | Nov. 8, 1944 |